US009588975B2

(12) United States Patent
Acharyya et al.

(10) Patent No.: US 9,588,975 B2
(45) Date of Patent: Mar. 7, 2017

(54) PROCESSING LARGE XML FILES BY SPLITTING AND HIERARCHICAL ORDERING

(71) Applicant: International Business Machines Corporation, Armonk, NY (US)

(72) Inventors: Ajoy Acharyya, Kolkata (IN); James E. Bostick, Cedar Park, TX (US); John M. Ganci, Jr., Cary, NC (US); Souvik Majumdar, Bentonville, AR (US); Shuvamoy Saha, Bentonville, AR (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/301,394

(22) Filed: Jun. 11, 2014

(65) Prior Publication Data

US 2015/0363414 A1 Dec. 17, 2015

(51) Int. Cl.
*G06F 17/30* (2006.01)
*G06F 11/14* (2006.01)

(52) U.S. Cl.
CPC .... *G06F 17/30091* (2013.01); *G06F 11/1474* (2013.01); *G06F 17/30221* (2013.01); *G06F 17/30914* (2013.01)

(58) Field of Classification Search
None
See application file for complete search history.

(56) References Cited

U.S. PATENT DOCUMENTS

| 7,080,400 | B1 | 7/2006 | Navar | |
|---|---|---|---|---|
| 8,145,608 | B2 | 3/2012 | Kunti et al. | |
| 2007/0288840 | A1* | 12/2007 | Girle | G06F 17/2247 715/234 |
| 2010/0115129 | A1* | 5/2010 | Hwang | G06F 8/427 709/242 |

(Continued)

FOREIGN PATENT DOCUMENTS

| WO | 2011092203 A1 | 8/2011 |
|---|---|---|
| WO | 2012078518 A2 | 6/2012 |

OTHER PUBLICATIONS

Pan, Yinfei, et al. "A static load-balancing scheme for parallel XML parsing on multicore CPUs." Seventh IEEE International Symposium on Cluster Computing and the Grid (CCGrid'07). IEEE, 2007.*

(Continued)

*Primary Examiner* — Aleksandr Kerzhner
*Assistant Examiner* — Eddy Cheung
(74) *Attorney, Agent, or Firm* — Daniel R. Simek

(57) ABSTRACT

A computer processor determines a schema that enables splitting of one or more elements of an XML file. The computer processor determines an XML file as a split candidate, based on one or more attributes of the one or more elements of the XML file. The computer processor splits the XML file at run-time into a plurality of subsets of the XML file, based on the one or more attributes of the one or more elements of the XML file, and the computer processor distributes the plurality of subsets of the XML file to a plurality of computing nodes of a computer processing system.

20 Claims, 5 Drawing Sheets

(56) References Cited

U.S. PATENT DOCUMENTS

| | | | | |
|---|---|---|---|---|
| 2011/0161946 A1* | 6/2011 | Thomson | ................. | G06F 8/34 |
| | | | | 717/155 |
| 2012/0079364 A1* | 3/2012 | Agarwal | ................ | G06F 8/456 |
| | | | | 715/234 |
| 2012/0173492 A1* | 7/2012 | Dunn | ................. | G06F 17/2725 |
| | | | | 707/687 |
| 2012/0303640 A1* | 11/2012 | Chamarthy | ........... | G06F 17/272 |
| | | | | 707/755 |
| 2014/0089332 A1* | 3/2014 | Maharana | ......... | G06F 17/30917 |
| | | | | 707/755 |

OTHER PUBLICATIONS

IBM, "System and method to support super large XML full handling", IP.com Prior Art Database Technical Disclosure, Original Publication Date: May 27, 2009, IPCOM000183553D, IP.com Electronic Publication: May 27, 2009, pp. 1-24.

Internet Society and A. Newton, "XML Pipelining with Chunks for the Internet Registry Information Service (RFC4992)", IP.com Prior Art Database Technical Disclosure, Original Publication Date: Aug. 1, 2007, IPCOM000156876D, IP.com Electronic Publication: Aug. 8, 2007, Copyright (C) The IETF Trust (2007), pp. 1-29.

\* cited by examiner

```
                                                         ~200
       250
       ┌─────────────────────────────────────────────────────┐
       │ <xs:element name="PURCHASE_ORDER_HEADER" type="po_header_type"/> ~205
       │ <xs:complexType name="po_header_type">
       │      <xs:attribute name="split" type="boolean" default=false/> ~210
       │      <xs:attribute name="hierachy" type="xs:string" default="1"/> ~215
       │                          ⋮
       │ <xs:element name="PO_LINE" type="po_line_type"/> ~220
       │ <xs:complexType name="po_line_type">
       │      <xs:attribute name="split" type="boolean" default="true"/> ~225
       │      <xs:attribute name="hierachy" type="xs:string" default="2"/> ~230
       │      <xs:attribute name="PO_Number" type="xs:integer"/>
       │                          ⋮
       │ <xs:element name="STORE" type="store_type"/> ~235
       │ <xs:complexType name="store_type">
       │      <xs:attribute name="split" type="boolean" default="true"/> ~245
       │      <xs:attribute name="hierachy" type="xs:string" default="3"/> ~240
       │      <xs:attribute name="PO_Number" type="xs:integer"/>
       │      <xs:attribute name="Line_Number" type="xs:integer"/>
       │                          ⋮
       └─────────────────────────────────────────────────────┘
```

FIG. 2

PROCESSING LARGE XML FILES BY SPLITTING AND HIERARCHICAL ORDERING

BACKGROUND OF THE INVENTION

The present invention relates generally to the field of processing XML files, and more particularly to splitting large XML files and processing elements in parallel on multiple computing nodes.

Extensible markup language (XML) is a markup language that defines a set of rules for encoding documents in a format that is both human-readable and machine-readable. XML is defined in several free open standards, and uses a textual data format primarily focused on documents, however, it is frequently used in web services. A "well-formed" XML document or file, is one that adheres to the syntax rules specified by a current XML specification, in that it must satisfy both physical and logical structures. The simplicity and usability of XML files contribute to a preference of use in transferring data over the Internet.

The number of XML formatted files, or messages, has significantly increased over recent years, especially in enterprise organizations. In addition to the number of XML files, the size of XML files has also increased significantly, creating issues related to processing and memory capacity to handle large numbers of very large files. In some cases, XML has become a "de facto" standard for transferring data from one step to the next, in business processes, or in data transfers between applications. Although some solutions have been offered, challenges related to central processing unit (CPU) and memory usage remain.

SUMMARY

According to an embodiment of the present invention, a method, computer program product, and computer system for processing an extensible markup language (XML) file by splitting the XML file, is provided. A computer processor determines a schema that enables splitting of one or more elements of an XML file. The computer processor receives an XML file which is generated based on the schema that includes a split attribute and a hierarchy attribute. The computer processor determines the XML file as a split candidate, based on one or more attributes of the one or more elements of the XML file. The computer processor splits at run-time, the XML file determined as the split candidate, into a plurality of subsets of the XML file, based on the one or more attributes of the one or more elements of the XML file, and the computer processor distributes the plurality of subsets of the XML file to a plurality of computing nodes of a computer processing system.

BRIEF DESCRIPTION OF THE DRAWINGS

FIG. 2 depicts exemplary XML code, including elements and attributes of a schema that enables splitting of an XML file, in accordance with an embodiment of the present invention.

DETAILED DESCRIPTION

Figure 1:
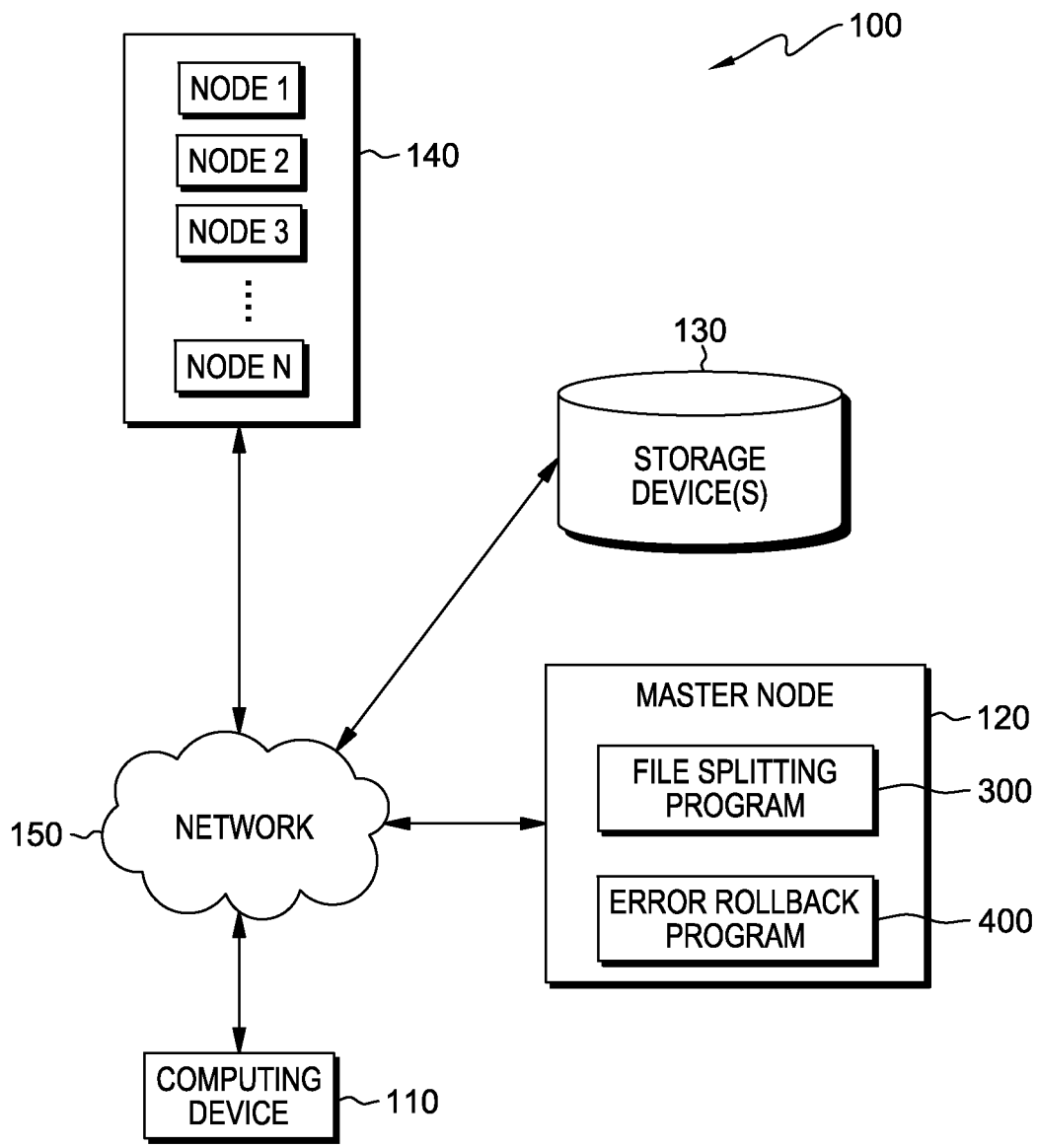
FIG. 1 is a functional block diagram illustrating a distributed computer processing environment, in accordance with one embodiment of the present invention.

Embodiments in accordance with the present invention recognize that extensible markup language (XML) formatted documents, herein referred to as XML files, have become a generally accepted format for transferring data between business process steps and between applications, as well as used in delivering data as part of web services. Both the number and size of XML files have shown major increases over time, resulting in an impact to network and central processing unit (CPU) performance. Large XML files consume significant amounts of CPU time of computing devices processing the files; however, solutions have failed to reduce the consumption of memory and CPU usage.

Embodiments in accordance with the present invention enable large XML files to be split into smaller subsets or "chunks", and processed substantially in parallel across multiple computing nodes of a distributed computer processing environment. Splitting of a large XML file is enabled by use of a schema that includes attributes indicating the candidacy of the file for splitting, based on the presence of high repetition of complex elements within the XML file. The schema also includes attributes identifying the hierarchy levels of the elements of the file. Candidates for splitting XML file elements avoid dependencies between the processing of one hierarchy level on the processing of another hierarchy level, indicating a flat hierarchy with relative data independence between hierarchy levels. Relationships between the parent and child elements of the XML file will be stated by passing the key values (foreign keys) as part of the attribute tag names.

Various embodiments identify candidate XML files using an enabling schema and split the XML file into chunks, which are sub-sets of data of the XML file, and distribute the chunks to available computer processing nodes of a multi-node distributed processing environment. The chunks are processed substantially in parallel, which significantly improves processing time and memory requirements. Embodiments of the present invention include a compensatory rollback process to un-d0 the processing of chunks in the event of notification of error detection, based on business rules associated with the processing of the XML file.

The splitting of large XML file elements is performed at strategic, pre-defined positions. The split is done at the master node of the distributed file system, based on the split attribute default value of an element. In response to the element being split into chunks, the chunks are passed to slave nodes for processing. The slave nodes will individually process each XML chunk and initiate the next transaction, typically a transaction of a downstream application. For example, after processing, the chunks of XML data need to be inserted or updated in a database. Each slave node will commit the data (that it has processed) individually. The master node will be notified when the slave node processing is complete, and a compensatory transaction will be initiated if one or more of the slave nodes fail to process a chunk of XML.

The present invention will now be described in detail with reference to the Figures. FIG. 1 is a functional block diagram illustrating a distributed computing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 includes computing device 110, master node 120, which operates splitting program 300 and error rollback program 400, storage device(s) 130, and distributed compute nodes 140, all interconnected via network 150. Network 150 can be, for example, a local area network (LAN), a telecommunications network, a wide area network (WAN), such as the Internet, a virtual local area network (VLAN), or any combination that can include wired, wireless, or fiber optic connections. In general, network 150 can be any combination of connections and protocols that will support communications between computing device 110, master node 120, storage device(s) 130, and distributed compute nodes 140, in accordance with embodiments of the present invention.

In various embodiments of the present invention, computing device 110 may be a laptop computer, a tablet computer, a personal digital assistant (PDA), a smart phone, or any programmable electronic device or combination of electronic devices capable of executing machine readable program instructions and of communicating with master node 120 via network 150, and with various other components and devices within distributed computing environment 100. Computing device 110 includes methods and techniques to generate large XML files, also referred to as large XML documents, using a schema that identifies the hierarchies of data in the file and the points at which the XML file may be split, in accordance with embodiments of the present invention. In some embodiments, computing device 110 transmits a large XML file, for example gigabyte size, to master node 120 via network 150. Computing device 110 may include internal and external hardware components, as depicted and described with reference to FIG. 5.

Storage device(s) 130 stores digital data and is capable of storing large XML files, hereafter referred to as a/the XML file(s), which are received as a byte steam. In some embodiment, storage device(s) 130 represents a distributed file system such as a Hadoop distributed file system (HDFS), that includes multiple devices interconnected over network 150, in which data may be stored across one or more of the multiple devices. In other embodiments storage device(s) 130 may be a single storage device accessible by master node 120 by direct connection (not shown), or by connection to network 150. In various embodiments of the present invention, storage device(s) 130 is used to write an XML file, received by master node 120, as a byte stream. By receiving the XML file as a byte stream, master node 120 does not perform parsing of the XML file as received, and does not perform any XML format verification. As the XML file is received, the file is written to storage device(s) 130. In one embodiment, storage device(s) 130 is a hard drive. In other embodiments storage device(s) 130 may be an optical drive, or a flash-memory drive. In yet other embodiments storage device(s) 130 may be random access memory (RAM); however, processing benefits may be realized by freeing RAM memory and writing the XML file to non-volatile storage.

Distributed compute nodes 140 are multiple computer processing nodes that perform as dependent slave nodes to master node 120. Distributed compute nodes 140 may include multiple computing processors located in multiple nodes. Distributed compute nodes 140 receive data and instructions from master node 120, which distributes computational workload to multiple computing processors of distributed compute nodes 140. The multiple processors process split parts, or chunks, of the XML file substantially in parallel. In various embodiments of the present invention, distributed compute nodes 140 receive chunks of data from the splitting of an XML file, and processes the chunks, forwarding output to a downstream application, which may be, for example, an application updating a database, or an application associated with a web service request. In various embodiments in accordance with the present invention, distributed compute nodes 140 perform parsing and validation of the chunk of the XML file and determine if it is "well formed" and valid, which is a check that the XML file adheres to the syntax and formatting rules specified by an XML standard specification are being met, and may include other file quality checks.

Master node 120 is a supervisory computing device in distributed processing environment 100, and includes split program 300 and error rollback program 400. Master node 120 receives an XML file as a byte stream and writes the XML file to storage. The XML file is determined whether it is a candidate for splitting when a logical portion of the XML file has been written to storage (but not necessarily waiting for the entire file to be written to storage), Master node 120 may begin processing the file. For example, master node 120 receives an XML file as a byte stream from computing device 110, via network 150. Master node 120, operating split program 300, begins writing the XML file to storage, and after a logical portion of the file, such as a header element, for example "PURCHASE_ORDER_HEADER", has been written to storage, master node 120 begins processing the portion of the XML file written to storage. The processing of the XML file is performed by split program 300, which in some embodiments of the present invention, resides on master node 120.

Master node 120 may be a management server, a web server, a mobile computing device, or any other electronic device or computing system capable of receiving and sending data. In other embodiments, master node 120 may represent a server computing system utilizing multiple computers as a server system, such as in a cloud computing environment. In another embodiment, master node 120 may be a laptop computer, a tablet computer, a netbook computer, a personal computer (PC), a desktop computer, or any programmable electronic device capable of communicating with distributed compute nodes 140, storage device(s) 130, and computing device 110, via network 150. In another embodiment, master node 120 represents a computing system utilizing clustered computers and components (e.g., database server computer, application server computers, etc.) that act as a single pool of seamless resources when accessed within distributed processing environment 100. Master node 120 may include internal and external hardware components, as depicted and described with reference to FIG. 5.

Master node 120 provides supervisory activities for the computing nodes of distributed compute nodes 140. The supervisory activities include, but not limited to, distributing workload, receiving status information of nodes, receiving notification of error detection from slave nodes, and taking action in response to receiving error messages from the nodes. Master node 120 includes splitting program 300, which determines if an XML file is a candidate for splitting. Determining the XML file to be such a candidate, splitting program 300 responds by splitting the XML file as designated by the split attributes of file elements, and in an order determined by hierarchy attributes of file elements. Splitting program 300 distributes the split elements of the XML file as chunks to multiple nodes of a distributed computer processing system, such as distributed compute nodes 140. In various embodiments, file splitting program 300 may be included on master node 120, or may be located elsewhere within distributed processing environment 100 and accessible to master node 120 via network 150.

Master node 120 also includes error rollback program 400, which responds to a detection of an error in processing a split element of an XML file by halting the processing of distributed split chunks of the XML file, and rolling back output of the processing that had completed prior to the error detection. Error rollback program 400 determines the appropriate error handling response to the detected error, based on business rules, and if designated, rolls back the entire processing of the split file elements, and responds with error details to the appropriate application. In some embodiments of the present invention, error handling requires the rollback of all processing of the split XML file, specifically if referential integrity may be compromised due to hierarchy relationships of chunks from split elements of the XML file, associated with the error. In a distributed processing environment, referential integrity refers to the relationship and dependency of the processing of a first element of data, on the successful completion of another element of data, often in a hierarchical structure of processing. In other embodiments, the error may not be associated with a referential integrity issue, and may not affect other processing of chunks of a split element, allowing updates of the XML file content to a downstream application to proceed. In such cases, error handling may address the error and potentially re-run the chunk or chunks of data producing the error at a later time.

FIG. 2 depicts an exemplary display of purchase order code 200, including elements and attributes of a schema that enables splitting of an XML file, in accordance to an embodiment of the present invention. It should be noted that the content of FIG. 2 is presented for purposes of example and illustration of XML code that includes attributes enabling splitting and ordering of elements of an XML file in accordance with an embodiment of the present invention. The content of FIG. 2 is not intended to be exhaustive or limited to the embodiments disclosed. FIG. 2 includes XML code 250, which is a partial depiction of exemplary XML code, and includes purchase order (PO) header element 205, PO line element 220, store element 235, split attributes 210, 225, and 240, and hierarchy attributes 215, 230, and 245. Embodiments of the present invention include XML attributes indicating whether particular elements of an XML file may be split into chunks that can be distributed to multiple processing nodes, which improves the processing time and memory needed to process the XML file.

XML code 250 utilizes a schema, which is a body of rules that define elements and attributes used in XML files and documents. XML files are designed using a schema for a particular application or purpose, and are applied to instances of XML files for the particular purpose. For example, multiple XML files, each including data for separate purchase orders, use the same design based on the same schema. The XML design may include a purchase order header, including the purchase order number for identification, and may also include line numbers, each of which identifies an item to be purchased. Additionally, for a business that has multiple location instances (branch offices or retail stores), the purchase order may include the store or business locations for which each line number purchase item applies.

The design used for XML code 250 includes PO header element 205, which is a file element identified as a "po_header_type". PO header element 205 has attributes, two of which are depicted by split attribute 210 and hierarchy attribute 215. Additional attributes may apply to PO header element 205, as is depicted by the ":" symbol. Embodiments of the present invention use split attributes and hierarchy attributes, such as split attribute 210 and hierarchy attribute 215, to identify XML files as candidates for splitting. The attributes respectively determine where to split the file and the order in which the file is split and processed. Hierarchy attribute 215 includes information defining a default level associated with the attribute as a string (or non-numeric text), and that the default level is 1, indicating the priority level of the hierarchy of PO_header element 205. Hierarchy attributes designate the order in which information associated with elements of the XML file are to be processed. An element with a hierarchy attribute value, or level, of 1 directs the processing of information associated with the element to be completed in its entirety before processing begins for an element of the file having a hierarchy attribute level of 2.

Split attribute 210 is an attribute of PO header element 205 and includes attribute name and attribute type information. The attribute name, "split" is associated with the element of the XML file, and attribute "type" information of the split attribute holds the Boolean values of either "true" or "false". Split attributes, in general, designate whether data associated with the element are candidates to be split. The default value of split attribute 210 is depicted as false, which indicates that the information associated with tags of hierarchy 1 are not candidates for splitting.

Hierarchy attribute 215 is an attribute of PO header element 205 and includes the attribute name "hierarchy" and attribute type of string, indicating a non-numeric character. The default hierarchy value of "1" indicates that PO header element 205 is at a hierarchy level of 1 and will be processed in priority over elements of the file with a hierarchy level of 2 or higher.

XML code 250 includes PO line element 220 as a file element identified as a "po_line_type". PO line element 220 includes split attribute 225 and hierarchy attribute 230, and additional attributes may apply to PO line element 220 as is depicted by the ":" symbol. Split attribute 225 has a Boolean value type and a default value of "true", indicating that PO line element 220 is a candidate for splitting. The value type of hierarchy attribute 230 is a string value, or non-numeric character, and has a default value of "2", indicating a level 2 hierarchy. The "true" split type value and level "2" hierarchy for the attributes of PO line element 220, indicate that the element is a candidate for splitting and will be processed ahead of elements of the XML file having a hierarchy level of 3 or greater, and after elements having a hierarchy level of 1.

XML code 250 also includes store element 235 as a file element identified as "store_type". Store element 235 includes split attribute 240 and hierarchy attribute 245, and additional attributes may apply to store element 235 as depicted by the ":" symbol. Split attribute 240 is depicted as a Boolean type value and having a default value of "true", indicating that store element 235 is a candidate for splitting.

Hierarchy attribute 245 is depicted as a string type value having a default non-numeric character value of "3", indicating that the element is at a third level of hierarchy and will be processed ahead of elements of the XML file having a hierarchy of level 4 or greater, if present, and after elements having a hierarchy level of 2.

Figure 3:
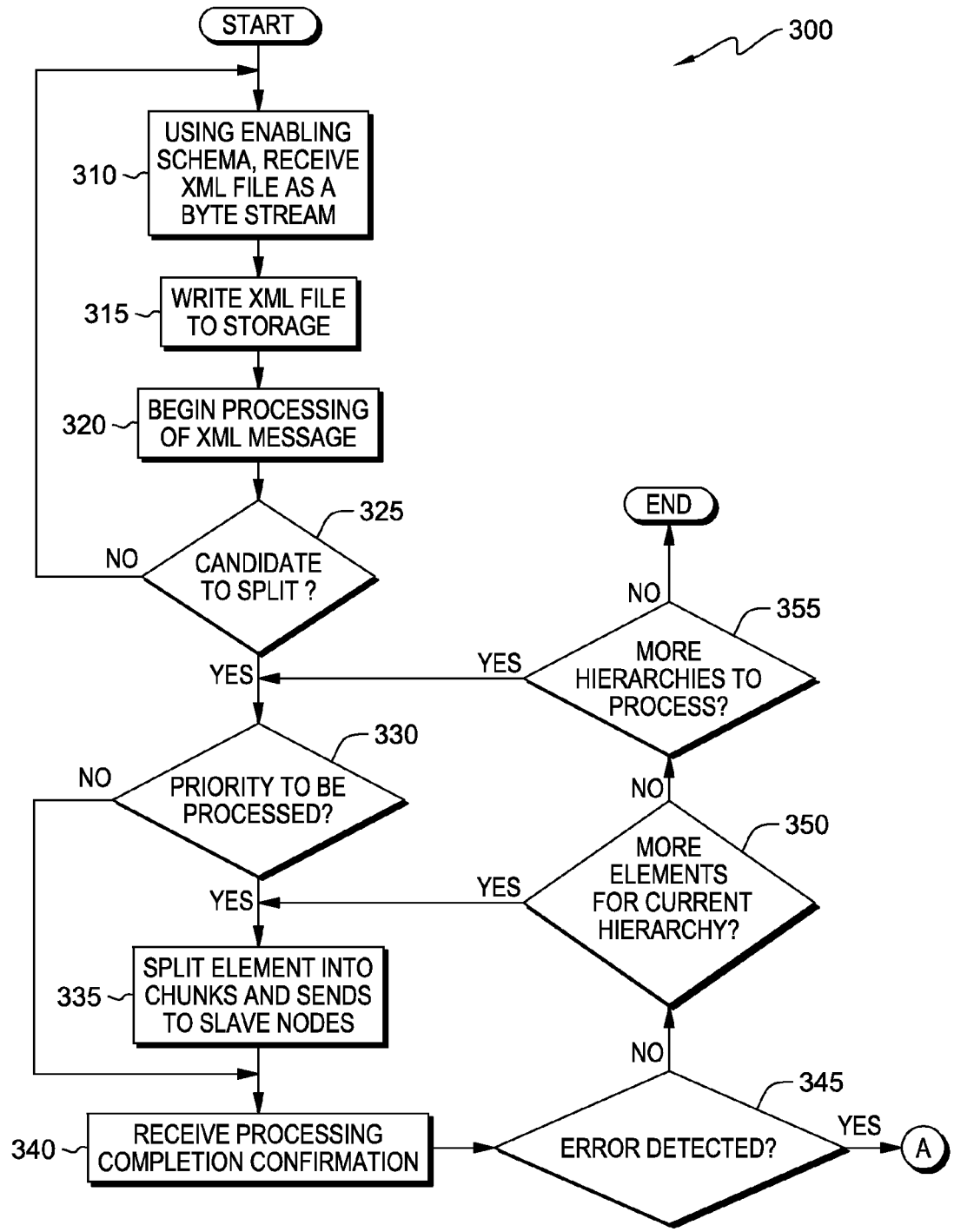
FIG. 3 illustrates operational steps of a splitting program, operating on a master node of the distributed computer processing environment of FIG. 1, in accordance with an embodiment of the present invention.

FIG. 3 illustrates operational steps of split program 300, operating on a master node of the distributed computer processing environment of FIG. 1, in accordance with an embodiment of the present invention. Split program 300 receives an XML file, which is based on an enabling schema, as a byte stream (step 310). An XML schema is a description of a type of XML file, or document, specifically expressing structure and content of that type of XML file, beyond the basic syntactical constraints of XML itself. Embodiments of the present invention use a schema design that includes split attributes, such as split attribute 210, which identifies the XML file elements that are candidates for splitting. The schema also includes hierarchy attributes, which indicate the processing priority level of the elements of the XML file. Rather than the master node, such as master node 120, processing the XML file to determine whether the file is well-formed, and perform other quality checks, the XML file is read by split program 300 as a byte stream and the XML file is not processed as it is received. For example, split program 300, operating on master node 120, receives a purchase order XML file and reads the XML file as a byte stream. Master node 120 does not perform validation processing of the received XML file.

Split program 300 writes the XML file to storage (step 315). As split program 300 receives the XML file, the file is written directly to a storage device, such as a hard drive, for example. There is no need to load the XML file into primary memory, as the entire XML file is written to storage as it is received; however, once a complete section of the XML file has been written to storage, such as a complex element containing other elements, known as child elements, processing of the XML file begins. For example, a purchase order XML file using an enabling schema design is received by split program 300, operating on master node 120 of distributed processing environment 100. The XML file is read by master node 120 as a byte stream of ones and zeroes, and is written directly to storage device(s) 130. The purchase order XML file includes a header element, and in response to the header element and a first complex element being written to storage device(s) 130, master node 120 begins to determine if the stored XML file element is a candidate for splitting; however, master node 120 does not perform parsing or validation of the XML file. An XML parser converts an XML file into an XML document object model (DOM), which can be manipulated with JavaScript.

Having written at least a complete section of the XML file to storage, split program 300 begins processing of the XML file (step 320). Split program 300, operating on master node 120, determines the size of the XML file and determines if there are complex elements with a hierarchy attribute. In one embodiment of the present invention, if the size of the XML file is determined to trigger a pre-defined threshold, for example, 100 MB or greater, split program 300 determines if the XML file includes complex elements, and if the elements include hierarchy attributes. The pre-determined threshold value will be based on various factors, for example, the performance desired in processing XML files, and the number of slave nodes available. The hierarchy attribute of a complex element determines the order of splitting the XML file elements, if the XML file is determined to be a candidate for splitting. Split program 300 operating on master node 120, does not perform the parsing operations of an XML file to be split.

For example, split program 300 determines that the purchase order XML file is 500 MB in size and exceeds a predefined threshold size of 100 MB. Split program 300 determines whether the purchase order header element of the XML file includes an attribute having a name of "hierarchy", which is a string type of attribute. Finding that the purchase order header element has a hierarchy attribute, split program 300 determines the default value of the hierarchy attribute to be 1, indicating the element is a first priority for processing.

Split program 300 determines whether the XML file is a candidate to split (decision step 325). In one embodiment of the present invention, split program 300 determines that an XML file is not a candidate for splitting if the schema used for the XML file does not enable splitting, which is indicated by the absence of complex elements having a split attribute and hierarchy attribute, or the presence of a hierarchy attribute, and a split attribute having a default value of "false". Additionally, XML files that are not very large in size, for example, less than 100 MB, may be determined by split program 300, to not be a candidate for splitting. In one embodiment, split program 300 determines that a first received XML file is not a candidate for splitting (step 325, "NO" branch), and split program 300 returns to receive a second XML file (return to step 310), and processing of the first XML file proceeds without splitting.

Split program 300 determines that the XML file is a candidate for splitting by identifying complex elements within the XML file having a split attribute with a default value of "true". Additionally, split program 300 determines that the XML file size is large enough to benefit both CPU load and memory demand, by splitting the XML file. For example, split program 300 determines that the XML file includes complex elements having a split attribute with a default value of "true". In one embodiment of the present invention, split program 300 also determines if the size of the XML file exceeds a pre-determined threshold size, for example, greater than 100 MB, and exceeding the threshold, in addition to the attribute status as discussed above, split program 300 determines the XML file to be a candidate for splitting. Determining that the XML file is a candidate for splitting (step 325, "YES" branch), split program 300 proceeds to determine whether an element is a priority to be processed (decision step 330). Split program 300 determines the default value of the hierarchy attribute for the complex elements of the XML file and processes the elements based on the default values. For example, a complex element having a hierarchy attribute default value of 1, is a higher priority and is processed before a complex element having a hierarchy attribute default value of 2.

Determining that the XML file element having the highest hierarchy priority that has not been processed, is not indicated to be split (step 330, "NO" branch), split program 300 bypasses splitting the tags of the element, and proceeds to process the element of the XML file (step 340). Split program 300 identifies the elements of the XML file and determines if there is a hierarchy attribute for the elements. Split program 300 determines the highest priority hierarchy, which has not been processed. In one embodiment, as the XML file is received, written to storage and determines whether elements of the file are to be split, the highest priority hierarchy begins with elements having a hierarchy attribute default value of "1", where the hierarchy value type is a character string. Split program 300 identifies the elements having a hierarchy attribute default value of 1 and checks the split attribute default value for the element. If the split default value is "false", the element is not split and split program 300 bypasses the splitting action and the XML file element is processed (step 340).

For example, a purchase order header element of the purchase order XML file may have a hierarchy attribute default value of 1, indicating the highest priority. The element may include simple date information and may not be repeated throughout the XML file. The split attribute associated with the element may have a default value of "false", indicating that the element is not to be split by split program 300. The purchase order header element is not split and in one embodiment of the present invention, may proceed to be processed by master node 120. In other embodiments, the purchase order header element, which is not split, is distributed to a node of distributed compute nodes 140, to be processed. The processing of the element includes parsing to determine if the element of the XML file is "well formed" and other quality checks of validation.

Having determined the XML file element(s) having the highest hierarchy priority not yet processed, and having a split attribute default value of true (step 330, "YES" branch), split program 300 splits the element into chunks and sends the chunks to slave nodes (step 335). The elements associated with hierarchy attribute default value having the highest priority, are split into chunks, or subsets of the XML file, and are distributed to slave nodes of a distributed processing system, for processing. All elements with a hierarchy attribute default value of 1 are split into chunks and distributed before elements with a hierarchy attribute default value of 2 are split into chunks and distributed. Similarly, all element tags with a hierarchy default value of 3 are split into chunks and distributed to slave nodes after all tags with hierarchy default value of 2 are split and distributed.

For example, split program 300 determines that the purchase order header element has a hierarchy attribute value of 1, but is not designated for splitting. Subsequent to elements having a hierarchy attribute value of 1 being processed, split program 300 determines the elements of the purchase order XML file having a hierarchy attribute default value of 2, such as the line number element. Split program 300 checks the split attribute default value for hierarchy 2 elements and if the split attribute value is set to true, split program 300 proceeds to step 335 to split the element into chunks and send the chunks to slave nodes.

As the chunks of the XML file element distributed to slave nodes are processed, split program 300 receives processing completion confirmation (step 340). Each chunk sent to a slave node is processed by the slave node, independently of other chunks processed on other slave nodes. The chunks are processed in a substantially parallel manner, thus improving processing time and reducing processing load on master node 120. Processing performed on a chunk distributed to a slave node includes performing parsing, in which the schema rules that define valid elements and attributes applied to an XML file are checked. Parsing includes syntax checks to determine if the XML file is well formed. Additionally, validation checks are preformed insuring that the XML file conforms to a specified pattern defined by a schema. The parsing and validation operations for split elements of the XML file, are moved to the slave nodes and are processed substantially in parallel, removing a significant processing load from the master node, such as master node 120, for example. Split program 300 receives confirmation of processing completion of the chunks distributed to nodes.

Having distributed chunks of the XML file to slave nodes for processing, split program 300 determines whether an error is detected (decision step 345). If an error occurs on a slave node while processing the chunks from the split element of an XML file, the error message is detected by split program 300. Types of errors that occur may include, but are not limited to, invalid attributes, XML syntax errors, data type errors, missing root element errors, and open tag errors. Error prevent the completion of processing of a chunk of the XML file distributed to a node. If the successful completion of data processing of one level of an XML hierarchical structure is required for the successful completion of another hierarchy level, the XML file cannot be successfully processed. Having detected that an error has occurred in the processing of split element chunks from the XML file (step 345, "YES" branch), split program 300 notifies the error handling component of the operating system and proceeds to "A", and passes program control to error rollback program 400 (discussed in detail with respect to FIG. 4).

Determining that an error has not been detected, (step 345, "NO" branch), split program 300 determines whether there are more elements to be split into chunks and sent to slave nodes, for the current hierarchy (decision step 350). Split program 300 confirms there are more elements for the current hierarchy to split and distribute (step 350, "YES" branch), and returns to split the elements into chunks and sends the chunks to slave nodes (step 335), and proceeds as described above. For example, after splitting the line number elements having a hierarchy value of 2, and distributing the chunks to available slave nodes for processing, split program 300 determines that there are additional hierarchy 2 elements to be split into chunks and distributed to slave nodes, when available. Split program 300 determines if the additional elements having a hierarchy attribute value of 2 also have a split attribute default value of "true", and in response, splits and distributes the elements.

Determining that there are no more elements of the current hierarchy to be split and distributed, (step 350, "NO" branch), split program 300 determines whether there are more hierarchy elements to process (decision step 355). Having determined that more element hierarchies are available to split (step 355, "YES" branch), split program 300 returns to determine the next hierarchy priority for remaining elements of the XML file that may be split (step 330), and proceeds as described above. For example, split program 300 completes splitting and distributing the line number elements of the purchase order XML file having a hierarchy default value of 2. Split program 300 determines that the "store" element of the XML file has a hierarchy attribute level of 3 and is considered a next-priority element. Split program 300 checks the split attribute of the store element and finding the default value to be "true", considers the store element as a candidate to split. Having identified hierarchy 3 elements having split attribute values of true, split program 300 proceeds to split and distribute the chunks from the element to available slave nodes of distributed compute nodes 140.

Determining that no more element hierarchies are to be split (step 355, "NO" branch), split program 300 ends.

Figure 4:
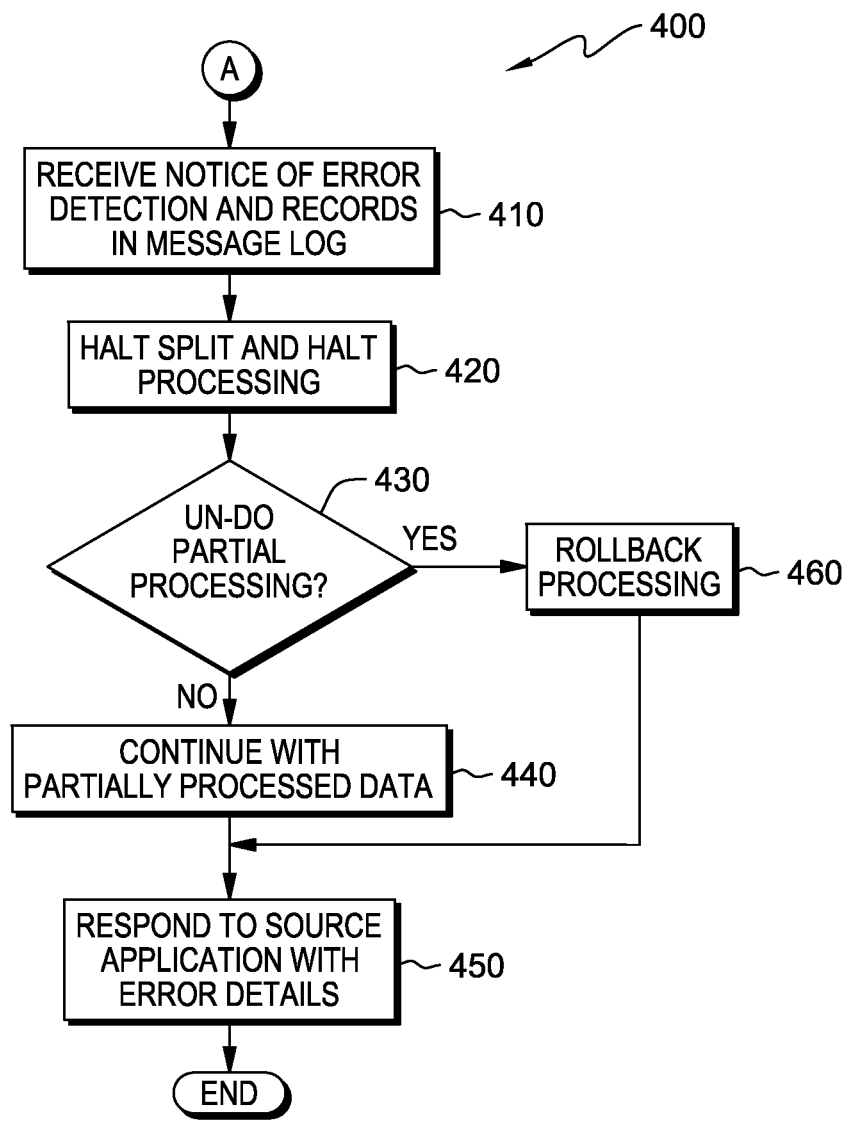
FIG. 4 illustrates operational steps of an error rollback program, operating on a master node of the distributed computer processing environment of FIG. 1, in accordance with an embodiment of the present invention.

FIG. 4 illustrates operational steps of an error rollback program, operating on a master node of the distributed computing environment of FIG. 1, in accordance with an embodiment of the present invention. Some embodiments of the present invention execute a compensatory transaction for detected failure associated with processing the XML file. In some embodiments, upon receiving notice of an error, processing of split XML elements are halted and rolled back to the conditions prior to an error detection.

Error rollback program 400, residing on the master node of a distributed processing environment, receives notice of an error detection and records the error in a message log (step 410). Split program 300, having determined an error has occurred, sends notice of the error to error rollback program 400, turns program control over to error rollback program 400, and ends. Error rollback program 400 records the error message in a message log, including relevant key information of the error.

Error rollback program 400 halts splitting and processing of the subsequent hierarchies (step 420). Because a relationship may exist between different hierarchies of XML file elements, the error may produce a lack of referential integrity and may affect the processing of subsequent hierarchies.

Error rollback program 400 may respond to the notice of error detection differently, based on the complex element of the XML file indicating the error, and the relationship of the element with other tags of the file. In some embodiments of the present invention, there may be business requirements in which continued processing of only a part of the XML file may be acceptable. In such cases, the master node responds back to the source application with the error details, and the error handling process is complete. In other embodiments, the entire XML file may need to be completely processed, in which case an error in processing requires the partial XML file transactions to be undone. Error rollback program 400 determines whether to undo partial processing of the XML file (decision step 430). Determining that business requirements allow partial processing of the XML file (step 430, "NO" branch), error rollback program 400 continues splitting and distributing subsequent element hierarchies of the XML file, and continues with partially processed data (step 440). Error rollback program 400 sends messages to slave nodes to continue processing and passing XML file data to downstream applications.

Having continued partially processing data, error rollback program 400 responds to the source application with error details (step 450). The source application determined the error in processing the XML element chunk on a slave node. The details of the error are sent to the source application and the error handling process is complete. The XML file elements associated with the error may be processed and sent to the downstream applications at a later time, and error rollback program 400 ends.

In other embodiments, an error in processing a chunk of an XML file element, processing at a slave node, may result in a referential problem with a downstream application, or in matching the data of the chunk associated with the error to corresponding data processing at another slave node. Determining that the error produces problems with referential integrity or other issues of data correspondence to other processing of chunks, error rollback program 400 determines an undo of partial processing of the XML file is to be performed (step 430, "YES" branch). Error rollback program 400 sends messages to the downstream application to rollback processing (step 460). Error rollback program 400 initiates a transaction to rollback the currently committed changes up to the error detection, by communicating with downstream application to un-do updates and transactions, effectively un-doing the completed steps of splitting and processing the XML file. The key information is still retained on the storage system accessible by the master node.

Error rollback program 400 responds to the source application with the error details (step 450). The details of the error are sent to the source application and the error handling process is complete. The XML file processing may be restarted and sent to the downstream applications at a later time, and error rollback program 400 ends.

Figure 5:
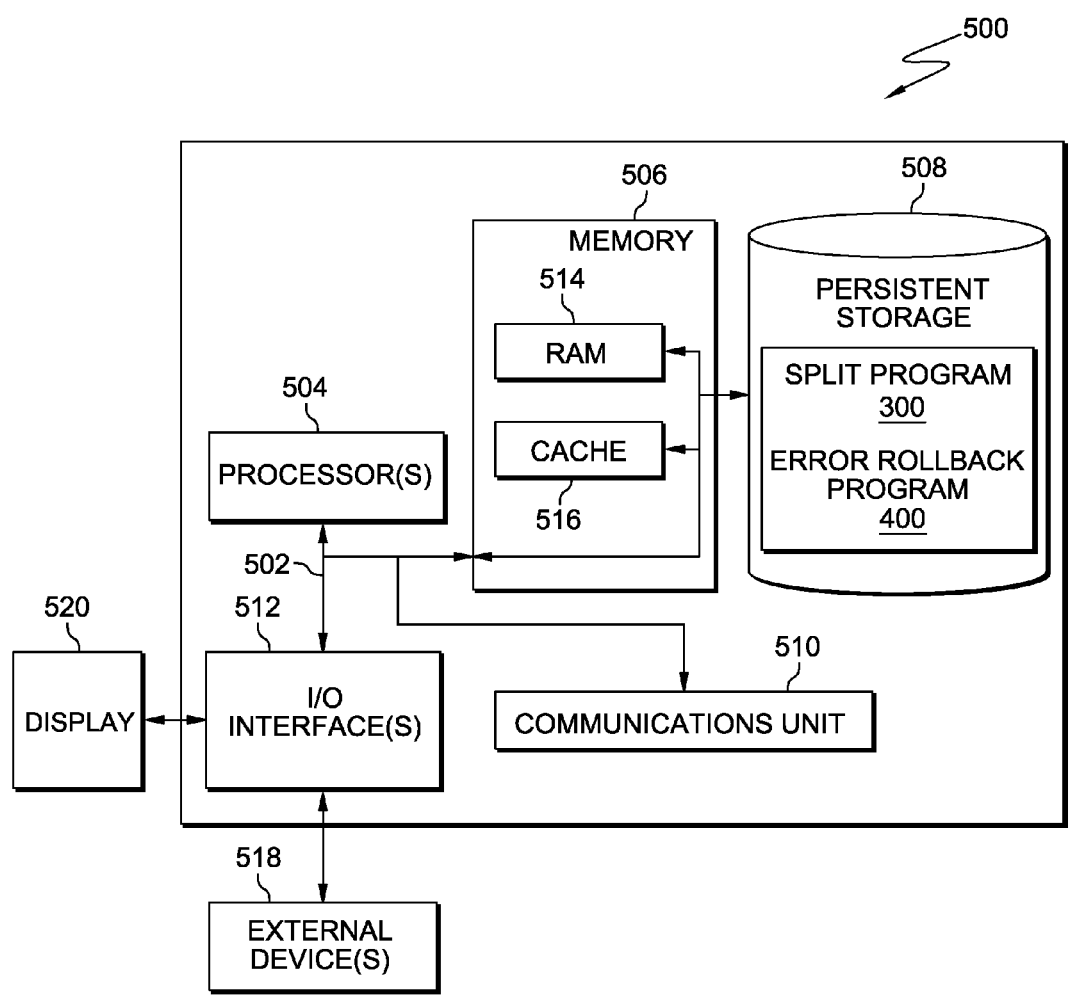
FIG. 5 depicts a block diagram of components of a computing device capable of operating the file splitting program and error rollback program, in accordance with an embodiment of the present invention.

FIG. 5 depicts a block diagram of components of computing device 500, capable of executing split program 300 and error rollback program 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Split program 300 and error rollback program 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed communication processing environment 100. In these examples, communications unit 510 includes one or more network interface cards. Communications unit 510 may provide communications through the use of either or both physical and wireless communications links. Split program 300 and error rollback program 400 may be downloaded to persistent storage 508 through communications unit 510.

I/O interface(s) 512 allows for input and output of data with other devices that may be connected to computing device 110 and master node 120, storage device(s) 130, and distributed compute nodes 140. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., split program 300 and error rollback program 400 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for processing an extensible markup language (XML) file by splitting the XML file, the method comprising:
   determining, by a computer processor, a schema that includes (i) one or more split attributes, which indicate whether one or more elements of an XML file are candidates for splitting, and (ii) one or more hierarchy attributes that indicate the relative order of processing of the one or more elements of the XML file;
   receiving, by the computer processor, an XML file as a byte stream, which is generated based on the schema that includes the one or more split attributes and the one or more hierarchy attributes;
   determining, by the computer processor, the XML file as a split candidate, based on a value of a split attribute of the one or more split attributes of the one or more elements of the XML file, wherein the value of a split attribute of the one or more split attributes is comprised of one or more characters that indicate whether an element of the one or more elements of the XML file is a candidate to be split;
   splitting at run-time, by the computer processor, the XML file determined as the split candidate, into a plurality of subsets of the XML file, based on the one or more split attributes included within the schema of the one or more elements of the XML file; and
   distributing, by the computer processor, the plurality of subsets of the XML file to a plurality of computing nodes of a computer processing system.

2. The method of claim 1, further comprising:
   receiving notification, by the computer processor, of an error associated with a failure to process at least one subset of the plurality of subsets of the XML file that is split, wherein the at least one subset is distributed to a computing node of the plurality of computing nodes of the computer processing system;
   responsive to receiving notification of the error, the computer processor, recording information about the error in a log; and
   performing, at least in part, by the computer processor, a rollback of processing performed on the at least one subset of the plurality of subsets, based, at least in part, on business rules, wherein the business rules define an extent of the rollback of the processing performed on the subset of the plurality of subsets.

3. The method of claim 1, wherein the split attribute includes a default value that indicates whether the element is to be split.

4. The method of claim 1, wherein the hierarchy attribute includes a default value that indicates an order of priority in which the one or more elements of the XML file are considered for processing.

5. The method of claim 1, wherein splitting of the one or more elements of the XML file and distributing the plurality of subsets of the XML file to the plurality of computing nodes of the computer processing system, precedes determining whether the XML file is well-formed, wherein a well-formed XML file adheres to syntax rules and formatting rules specified by an XML standard specification.

6. The method of claim 1, further comprising:
   receiving, by the computer processor, the XML file as a byte file, wherein the XML file is written to a storage device as received, prior to processing the XML file.

7. The method of claim 1, wherein the plurality of computing nodes are part of a distributed storage and a distributed processor system.

8. The method of claim 1, wherein determining the XML file as a split candidate, further comprises:
   comparing, by the computer processor, a size of the XML file to a pre-determined threshold size; and
   in response to the size of the XML file exceeding the pre-determined threshold size, determining the XML file as a split candidate, based on the split attribute value of the one or more elements of the XML file.

9. A computer program product for processing an extensible markup language (XML) file by splitting the XML file, the computer program product comprising:
   a computer readable storage medium having program instructions embodied therewith, wherein the program instructions are executable by a computer processor to cause the computer processor to perform a method comprising:
      determining a schema that includes (i) one or more split attributes, which indicate whether one or more elements of an XML file are candidates for splitting, and (ii) one or more hierarchy attributes that indicate the relative order of processing of the one or more elements of the XML file;
      receiving an XML file as a byte stream, which is generated based on the schema that includes the one or more split attributes and the one or more hierarchy attributes;
      determining the XML file as a split candidate, based on a value of the split attribute of the one or more split attributes of the one or more elements of the XML file, wherein the value of the split attribute is comprised of one or more characters that indicate whether an element of the one or more elements of the XML file is a candidate to be split;
      splitting at run-time the XML file determined as the split candidate, into a plurality of subsets of the XML file, based on the one or more split attributes included within the schema of the one or more elements of the XML file; and
      distributing the plurality of subsets of the XML file to a plurality of computing nodes of a computer processing system.

10. The computer program product of claim 9, further comprising:
   receiving notification of an error associated with a failure to process at least one subset of the plurality of subsets of the XML file that is split, wherein the at least one subset is distributed to a computing node of the plurality of computing nodes of the computer processing system;

responsive to receiving notification of the error, recording information about the error in a log; and performing at least in part, a rollback of processing performed on the at least one subset of the plurality of subsets, based, at least in part, on business rules, wherein the business rules define an extent of the rollback of the processing performed on the at least one subset of the plurality of subsets.

11. The method of claim 9, wherein the split attribute includes a default value that indicates whether the element is to be split, and wherein the hierarchy attribute includes a default value that indicates an order of priority in which the one or more elements of the XML file are considered for processing.

12. The computer program product of claim 9, wherein splitting of the one or more elements of the XML file and distributing the plurality of subsets of the XML file to the plurality of computing nodes of the computer processing system, precedes determining whether the XML file is well-formed, wherein an XML file that is well-formed adheres to syntax rules and formatting rules specified by an XML standard specification.

13. The computer program product of claim 9, further comprising:
receiving the XML file as a byte file, wherein the XML file is written to storage device as received, prior to processing the XML file.

14. The computer program product of claim 9, wherein determining the XML file as a split candidate, further comprises:
comparing a size of the XML file to a pre-determined threshold size; and
in response to the size of the XML file exceeding the pre-determined threshold size, determining the XML file as a split candidate, based on the value of the split attribute of the one or more elements of the XML file.

15. The computer program product of claim 9, wherein the plurality of computing nodes are part of a distributed storage and a distributed processor system.

16. A computer system for processing an extensible markup language (XML) file by splitting the XML file, the computer system comprising:
one or more computer processors;
one or more computer readable storage media; and
program instructions stored on the computer readable storage media for execution by at least one of the one or more processors, the program instructions comprising:
program instructions to determine a schema that includes (i) one or more split attributes, which, indicate whether one or more elements of an XML file are candidates for splitting, and (ii) one or more hierarchy attributes that indicate the relative order of processing of the one or more elements of the XML file;
program instructions to receive an XML file as a byte stream, which is generated based on the schema that includes the one or more split attributes and the one or more hierarchy attributes;

program instructions to determine the XML file as a split candidate, based on a value of a split attribute of the one or more split attributes of the one or more elements of the XML file, wherein a value of the split attribute of the one or more split attributes is comprised of one or more characters that indicate whether an element of the one or more elements of the XML file is a candidate to be split;
program instructions to split at run-time, the XML file determined as the split candidate, into a plurality of subsets of the XML file, based on the one or more split attributes included within the schema of the one or more elements of the XML file; and
program instructions to distribute the plurality of subsets of the XML file to a plurality of computing nodes of a computer processing system.

17. The computer system of claim 16, further comprising:
program instructions to receive notification, of an error associated with a failure to process at least one subset of the plurality of subsets of the XML file that is split, wherein the at least one subset is distributed to a computing node of the plurality of computing nodes of the computer processing system;
responsive to receiving notification of the error, program instructions to record information about the error in a log; and
program instructions to perform at least in part, a rollback of processing performed on the at least one subset of the plurality of subsets, based, at least in part, on business rules, wherein the business rules define an extent of the rollback of the processing performed on the at least one subset of the plurality of subsets.

18. The computer system of claim 16, wherein the attributes of the one or more elements of the XML file include at least one of a split attribute and a hierarchy attribute, and wherein the split attribute includes a default value that indicates whether the one or more elements of the XML file are to be split, and wherein the hierarchy attribute includes a default value that indicates an order of priority in which the one or more elements of the XML file are considered for processing.

19. The computer system of claim 16, wherein splitting of the one or more elements of the XML file and distributing the plurality of subsets of the XML file to the plurality of computing nodes of the computer processing system, precedes determining whether the XML file is well-formed, wherein an XML file that is well-formed adheres to syntax rules and formatting rules specified by an XML standard specification.

20. The computer system of claim 16, wherein determining the XML file as a split candidate, further comprises:
program instructions to compare a size of the XML file to a pre-determined threshold size; and
in response to the size of the XML file exceeding the pre-determined threshold size, program instructions to determine the XML file as a split candidate, based on the split attribute value of the one or more elements of the XML file.

* * * * *